L. P. HYNES.
MOTOR FOR STEAM RADIATOR VALVES.
APPLICATION FILED MAY 19, 1913.
1,202,527.
Patented Oct. 24, 1916.
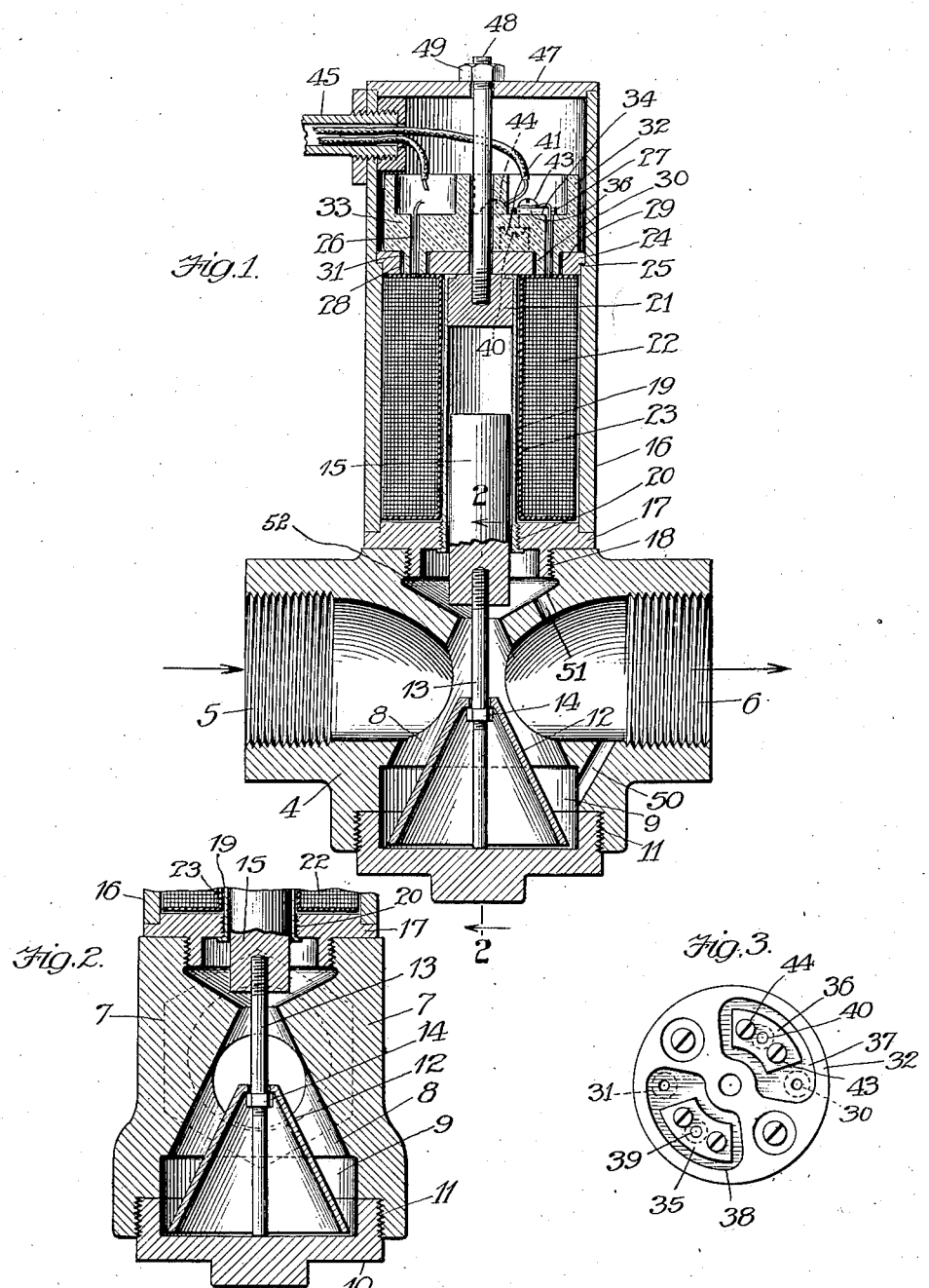

UNITED STATES PATENT OFFICE.

LEE P. HYNES, OF CHICAGO, ILLINOIS, ASSIGNOR TO RAILWAY UTILITY COMPANY, OF CHICAGO, ILLINOIS, A CORPORATION OF ILLINOIS.

MOTOR FOR STEAM-RADIATOR VALVES.

1,202,527.  Specification of Letters Patent.  Patented Oct. 24, 1916.

Application filed May 19, 1913. Serial No. 768,606.

*To all whom it may concern:*

Be it known that I, LEE P. HYNES, a citizen of the United States, residing at Chicago, in the county of Cook and State of Illinois, have invented certain new and useful Improvements in Motors for Steam-Radiator Valves, of which the following is a specification.

While I have described my invention hereinafter more particularly with relation to its use in connection with motors for steam radiators, it will be readily understood that it is applicable to a variety of other uses and that though the specific form shown and described is that preferred by me it is disclosed for the purpose of exemplification only and the invention may be embodied in various other forms; the scope of the same, however, is defined in the following claims in which I have endeavored to distinguish the invention from the prior art so far as known to me without, however, relinquishing or abandoning any portion thereof.

In the accompanying drawings illustrating the preferred form of my invention, Figure 1 is a longitudinal vertical section thereof; Fig. 2 a partial transverse section on the line 2—2 of Fig. 1 and at right angles to the plane thereof, and Fig. 3 a plan of a portion of the construction to be referred to hereinafter.

The valve proper comprises a casing 4 which preferably is cast from suitable metal and has a through-way passage from the inlet nipple 5 to the outlet nipple 6. Intermediate said inlet and outlet the passage is contracted by inwardly projecting abutments 7, 7 (see Fig. 2) in or between which and communicating with the inlet and outlet ports respectively is formed a tapering valve seat 8 shown as conical, the larger diameter of which is at the bottom. The precise form of this valve seat is immaterial and it may vary in vertical section but it should be circular in cross-section and substantially tapering at its operative portion. Beneath the said valve seat the casing is chambered as at 9 and the lower end of the chamber is closed by a cap 10 screwing into a threaded opening 11 in the casing. A valve 12 corresponding in form to the valve seat 8, above mentioned, coöperates with the latter, and in the present instance is shown as conical to fit the valve seat and hollow. The valve is loosely mounted upon a rod 13 which is provided at 14 with a nut threaded thereon and which engages beneath the upper end of the conical valve 12 to support the same. The lower end of the rod abuts the cap 10 to limit the downward movement of the valve and the upper end is threaded into the movable core 15 of a solenoid, the latter being inclosed in a casing 16 having a bottom portion 17 provided with a hollow exteriorly threaded boss 18 which is screwed into a corresponding opening in the upper side of the valve casing.

The movable core 15 is free to reciprocate within a sleeve 19 of non-magnetic metal, the lower end of which is screwed as at 20 into the bottom portion of the solenoid casing 16, so that its interior opens into the chamber 52 in the valve casing. The upper end of the sleeve 19 is hermetically sealed by a stationary magnetic core 21 which assists in attracting the movable core and maintaining the valve on its seat when the solenoid 22 surrounding the sleeve 19 is energized by the passing of a current. For convenience the solenoid 22 is mounted upon a spool 23 which may be slipped on or off the sleeve 19 and is held in place by a cover plate 24 of iron which rests at 25 upon a shoulder formed by boring out the upper end of the solenoid casing.

The cover 24, casing 16 and bottom plate 17 being all of magnetic material form with the stationary core 21 and the movable core 15 a substantially closed magnetic circuit. The lead wires 26, 27 for the coil extend through openings 28, 29 in the cover plate, and are insulated in these openings by hollow tubular bosses or bushings 30, 31 depending from a circular porcelain insulating block 32. Said lead wires at their upper ends are secured to connection plates 35, 36 which are fastened upon the floors or recesses 37, 38 formed in the top of the insulating block. In Fig. 1 no connection plate is shown in recess 37. Screws 39, 40 the heads of which are let into small openings 41 in the bottom of the insulated block serve to hold the connection plates in position and the latter are provided upon their opposite ends with screws 43, 44, one of which on each plate is used for securing the end of the corresponding terminal wire of the solenoid and the other of which is employed for connecting up the leading-in wire. The leading-in wires are insulated, connected to the screws provided for that purpose, and pass out through a threaded pipe 45 extending into and through the wall 16 of the solenoid casing for this purpose. The above described construction affords substantially heat proof insulation. A cap plate 47 closes the upper end of the solenoid casing and is secured in position by a threaded bolt 48 having a nut 49 for this purpose and threaded at its lower end into the stationary core 21.

An opening 50 is formed between the outlet passage and the chamber 9 which receives the valve in its lowered position in order that said chamber may not fill up with liquid and prevent downward movement of the valve, and a somewhat similar passage 51 is formed between the outlet of the casing and upper chamber 52 for the reason that as said chamber also communicates with the valve seat steam is apt to pass thereinto when the valve is open and condense therein when the valve is closed thereby forming a partial vacuum and interfering with the operation of the valve.

It will be understood that when the current is passed through the solenoid coil the latter retracts its core thereby drawing the valve up to its seat and closing the passage therethrough. The solenoid with its stationary core 21 holds the movable core in place in its upper position with considerable force even though but a small current be passed through the coil and though the attraction exerted on the movable core to close the valve is not great when the latter is in its open position it is sufficient for the purpose since there is no great circumferential pressure at this time operating to hold the valve open.

The valve and its parts are easily and cheaply manufactured, there being no necessity of very accurate work by reason of the capacity of the valve to accommodate itself to its seat.

I claim:

1. A valve operating motor comprising a housing adapted to be mounted on a valve and to communicate with the chamber thereof, an electro-magnetic coil in the housing, means controlled thereby for operating the valve, a cover plate of magnetic material over the coil having openings therein for the terminals of the coil, a block of insulating material on said plate comprising insulating bushings extending into said openings, connection plates mounted on said block to which the terminals of the coil are respectively connected.

2. A valve operating motor comprising a housing of magnetic material adapted to be mounted on a valve casing and to open thereinto, a coil 22 mounted in the housing, a solenoid core 15 controlled by said coil and adapted to be connected to the valve, a plate 24 of magnetic material mounted above the coil, a block 32 of insulating material mounted on said plate and comprising bushings 30—31 extending into openings in said plate, connection plates 35—36 mounted in recesses in said block and connected respectively to the terminals of the coil, a cap plate 47 above the insulating block and a bolt 48 extending through the block and cap plate and a nut 49 securing the cap in place.

LEE P. HYNES.

Witnesses:
ROBERT DOBBERMAN,
LOUIS B. ERWIN.